United States Patent
Nam et al.

(10) Patent No.: US 10,211,906 B1
(45) Date of Patent: Feb. 19, 2019

(54) TWO-STAGE SPATIAL COMPRESSION METHOD

(71) Applicant: Intel Corporation, Santa Clara, CA (US)

(72) Inventors: Junyoung Nam, Sunnyvale, CA (US); Oner Orhan, San Jose, CA (US); Hosein Nikopour, San Jose, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/928,188

(22) Filed: Mar. 22, 2018

(51) Int. Cl.
H04B 7/08 (2006.01)
H04B 7/0452 (2017.01)
H04L 25/02 (2006.01)
H04B 7/0426 (2017.01)

(52) U.S. Cl.
CPC .......... *H04B 7/0868* (2013.01); *H04B 7/043* (2013.01); *H04B 7/0452* (2013.01); *H04L 25/021* (2013.01); *H04L 25/0228* (2013.01); *H04L 25/0248* (2013.01)

(58) Field of Classification Search
CPC .... H04B 7/0868; H04B 7/043; H04B 7/0452; H04L 25/0248; H04L 25/0228; H04L 25/021
See application file for complete search history.

(56) References Cited

U.S. PATENT DOCUMENTS

| 5,059,966 | A | * | 10/1991 | Fujisaka | G01S 13/87 342/195 |
| 2010/0331689 | A1 | * | 12/2010 | Wegener | A61B 8/06 600/443 |
| 2016/0294457 | A1 | * | 10/2016 | Lee | H04B 7/0478 |

OTHER PUBLICATIONS

O'Mahony et al.: "The future of electrical I/O for microprocessors", 2009 International Symposium on VLSI Design, Automation and Test, Apr. 2009, pp. 31-34.
Choi et al.: "Space-Time Fronthaul Compression of Complex Baseband Uplink LTE Signals", 2016 IEEE International Conference on Communications, May 2016, 6 pages.

* cited by examiner

*Primary Examiner* — Vineeta S Panwalkar
(74) *Attorney, Agent, or Firm* — Viering, Jentschura & Partner MBB

(57) ABSTRACT

A wireless communication device comprises at least one antenna array configured to receive a radio signal; a first compressor configured to determine a first compression operator based on a predetermined set of receive configurations for the antenna array, and to apply the first compression operator to the radio signal to generate a first compressed signal;
a second compressor configured to apply a second compression operator to the first compressed signal to generate a second compressed signal; a channel estimator configured to determine a channel covariance of the radio signal, determine at least one eigenvector of the channel covariance to obtain a second compression (Continued)

operator, and provide the second compression operator to the second compressor; and a baseband processor configured to receive the second compressed signal from the second compressor and to process the second compressed signal to obtain output data.

20 Claims, 6 Drawing Sheets

TWO-STAGE SPATIAL COMPRESSION METHOD

TECHNICAL FIELD

Various embodiments relate generally to signal compression for receivers employing beamforming.

BACKGROUND

Antenna-based communication systems may utilize beamforming in order to create steered antenna beams with an antenna array or antenna arrays. Beamforming systems may adjust the delay and/or gain of each of the signals transmitted by (or received with in the receive direction) the elements of an antenna array in order to create patterns of constructive and destructive inference at certain angular directions. Through precise selection of the delays and gains of each antenna element, a beamforming architecture may control the resulting interference pattern in order to realize a steerable "main lobe" that provides high beamgain in a particular direction.

Beamforming architectures may conventionally employ one or both of digital and analog radio frequency (RF) processing in order to apply the desired delay and gain factors at each element of the array. Phased antenna arrays are a particularly favored RF beamforming technique for narrowband signals which relies on the approximate equivalence between phase shifts and time delays for narrowband signals. Accordingly, phased antenna arrays may place an RF phase shifter in the signal path of each antenna element and allow the individual phase shift values to be adjusted in order to steer the resulting antenna beam. Although many phased array designs achieve sufficient performance with phase-only control, variable gain amplifiers and other techniques such as tapering may additionally be implemented in order to also allow for gain adjustment.

In contrast to the analog RF processing of RF beamformers, digital beamformers may employ digital processing in the baseband domain in order to impart the desired phase/delay and gain factors on the antenna array. Accordingly, in digital beamforming systems, the phase and gain for each antenna element may be applied digitally to each respective antenna signal in the baseband domain as a complex weight. The resulting weighted signals may then each be applied to a separate radio frequency (RF) chain, which may each mix the received weighted signals to radio frequencies and provide the modulated signals to a respective antenna element of the antenna array. As each antenna element in a digital beamforming system uses an exclusive RF chain, many digital beamforming solutions may use a substantial amount of hardware and thus have considerable cost and power-consumption rates.

Hybrid beamforming solutions may apply beamforming in both the baseband and RF domains, and may utilize a reduced number of RF chains connected to a number of low-complexity analog RF phase shifters. Each analog RF phase shifter may feed into a respective antenna element of the array, thus creating groups of antenna elements that each correspond to a unique RF phase shifter and collectively correspond to a common RF chain. Such hybrid systems may thus reduce the number of RF chains by accepting slight performance degradations resulting from the reliance on RF phase shifters instead of digital complex weighting elements.

In particular for next generation (5G and beyond) cellular systems, Massive MIMO and mm-Wave communications are expected to enable 1000× more data traffic than current cellular systems. Fully digital receiver architectures at a user equipment (UE) may achieve low latency sector sweeping as well as high throughput performance in mm-Wave systems. However, in a fully digital architecture data interfaces (IO links) from analog-to-digital converter (ADC) output (RFIC) to digital baseband processor have high power requirements because a large number of antennas, wide bandwidth, and high throughput mm-Wave RF front-end often uses high-bandwidth and rate interfaces to deliver data to baseband peripherals such as processor and memory. Therefore, approaches that may reduce power consumption may in particular contribute to an implementation of fully digital receiver architectures in practical cellular systems. As power consumption is a general issue, such approaches may further also facilitate implementation of analog, fully connected hybrid, subarray type hybrid, fully digital beamforming architectures, regardless mm-Wave and below 6 GHz systems.

Reducing power consumption may be achieved by reducing the number of 10 links which may rely on spatial compression of ADC output signals. Thereby, spatial compression assuming single-cell (or isolated) environments can already provide efficient compression methods. However, at the digital baseband input a desired signal is often superimposed with intra-cell/inter-cell interference and sometimes even out-of-band blockers which limits effectiveness of such spatial compression approaches.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

in FIGS. 4 and 5;

DESCRIPTION

Figure 1:
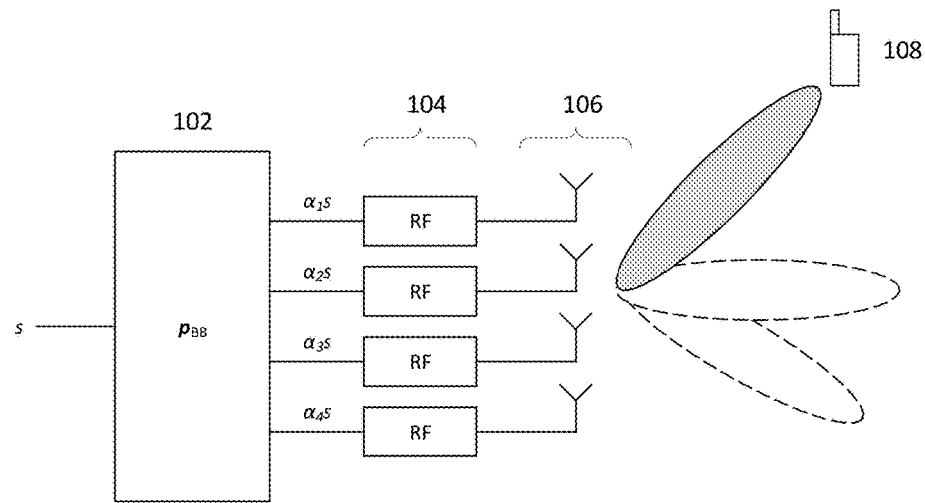
FIG. 1 shows an exemplary RF beamforming architecture.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions.

Beamforming systems have been targeted as a potentially important component in high frequency next-generation communication networks such as millimeter wave (mm-Wave) and other so-called "5G" radio technologies. These radio technologies may operate at carrier frequencies of 30 GHz and above, and may target high beamforming gains to compensate for the high path loss associated with carrier frequencies in these ranges.

Figure 2:
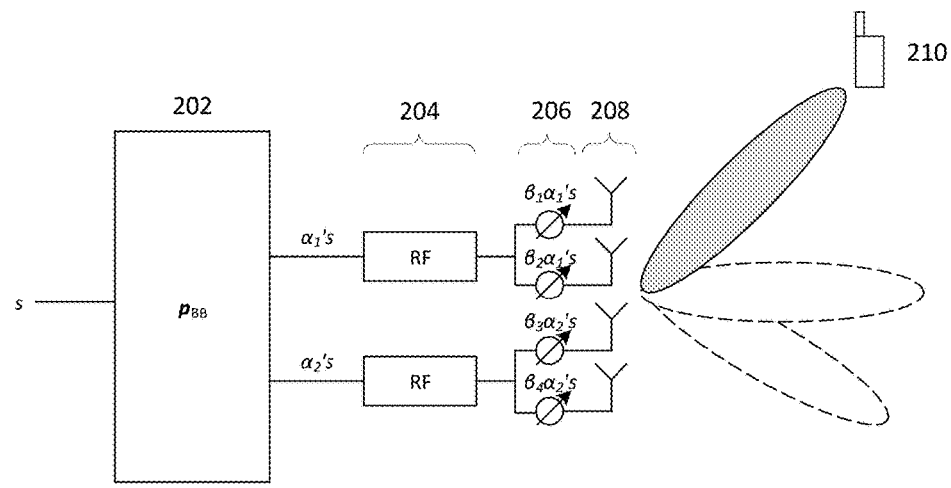
FIG. 2 shows an exemplary hybrid digital/RF beamforming architecture.

Beamforming systems may perform processing in one or both of the baseband and RF domains to shape antenna array beam patterns. FIGS. 1 and 2 show two simplified beamforming approaches as deployed for an exemplary four-element antenna array. Although the following exemplary description with reference to FIGS. 1 to 3 may focus on a transmit beamforming context, skilled persons will appreciate the ability to likewise use an analogous implementation for receive beamforming, which may include combining the signals received at the antenna elements according to a complex weight array in order to adjust the received beam pattern. In other words, what is detailed in the following for a steered transmit beam applies in analogy to a receive beam.

FIG. 1 illustrates a simplified exemplary digital baseband beamforming architecture that digitally applies complex beamforming weights (composed of both a gain and phase factor) in the baseband domain. As shown in FIG. 1, digital beamformer 102 may receive baseband symbol s and subsequently apply a complex weight vector $p_{BB}=[\alpha_1\ \alpha_2\ \alpha_3\ \alpha_4]^T$ to s to generate $p_{BB}s$, where each element $\alpha_i$, i=1, 2, 3, 4 is a complex weight (comprising a gain factor and phase shift). Accordingly, each resulting element $[\alpha_1 s\ \alpha_2 s\ \alpha_3 s\ \alpha_4 s]^T$ of $p_{BB}s$ may be baseband symbol s multiplied by some complex weight $\alpha_1$. Digital beamformer 102 may then map each element of $p_{BB}s$ to a respective RF chain of RF system 104, which may each perform digital to analog conversion (DAC), radio carrier modulation, and amplification on the received weighted symbols before providing the resulting RF symbols to a respective element of antenna array 106. Antenna array 106 may then wirelessly transmit each RF symbol. This exemplary model may also be extended to a multi-layer case where a baseband symbol vector s containing multiple baseband symbols $s_1$, $s_2$, etc., in which case baseband precoding vector $p_{BB}$ may be expanded to a baseband precoding matrix $p_{BB}$ for application to baseband symbol vector s. In this case, $\alpha_i$, i=1, 2, 3, 4 are row vectors, and $p_{BB}s=[\alpha_1 s\ \alpha_2 s\ \alpha_3 s\ \alpha_4 s]^T$. Thus, after multiplying $p_{BB}$ and s, the overall dimension is the same as the overall dimension at the output of digital beamformer 102. The below descriptions thus refer to digital beamformer 102 as $p_{BB}$ and transmit symbol/vector as s for this reason while this model can be extended to further dimensions as explained.

By manipulating the beamforming weights of $p_{BB}$, digital beamformer 102 may be able to utilize each of the four antenna elements of antenna array 106 to produce a steered beam that has a greater beamgain compared to a single antenna element. The radio signals emitted by each element of antenna array 106 may combine to realize a combined waveform that exhibits a pattern of constructive and destructive interference that varies over distances and direction from antenna array 106. Depending on a number of factors (including e.g. antenna array spacing and alignment, radiation patterns, carrier frequency, etc.), the various points of constructive and destructive interference of the combined waveform may create a focused beam lobe that can be "steered" in direction via adjustment of the phase and gain factors $\alpha_1$ of $p_{BB}$. FIG. 1 shows several exemplary steered beams emitted by antenna array 106, which digital beamformer 102 may directly control by adjusting $p_{BB}$. Although only steerable main lobes are depicted in the simplified illustration of FIG. 1, digital beamformer 102 may be able to comprehensively "form" the overall beam pattern including nulls and sidelobes through similar adjustment of $p_{BB}$.

In so-called adaptive beamforming approaches, digital beamformer 102 may dynamically change the beamforming weights to adjust the direction and strength of the main lobe in addition to nulls and sidelobes. Such adaptive approaches may allow digital beamformer 102 to steer the beam in different directions over time, which may be useful to track the location of a moving target point (e.g. a moving receiver or transmitter). In a mobile communication context, digital beamformer 102 may identify the location of a target User Equipment (UE) 108 (e.g. the direction or angle of UE 108 relative to antenna array 106) and subsequently adjust $p_{BB}$ in order to generate a beam pattern with a main lobe pointing towards UE 108, thus improving the array gain at UE 108 and consequently improving the receiver performance. Through adaptive beamforming, digital beamformer 102 may be able to dynamically adjust or "steer" the beam pattern as UE 108 moves to continuously provide focused transmissions to UE 108 (or conversely focused reception).

Digital beamformer 102 may be implemented as a microprocessor, and accordingly may be able to exercise a high degree of control over both gain and phase adjustments of $p_{BB}$ through digital processing. However, as shown in FIG. 1 for RF system 104 and antenna array 106, digital beamforming configurations may use a dedicated RF chain for each element of antenna array 106 (where each RF chain performs radio processing on a separate weighted symbol $\alpha_i s$ provided by digital beamformer 102); i.e. $N_{RF}=N_r$ where $N_{RF}$ is the number of RF chains and $N_r$ is the number of antenna elements. Given the complex assortment of circuitry for each RF chain (DAC, amplification, mixing, etc.), such digital beamforming approaches may be relatively expensive and non-optimal in terms of power-efficiency. These issues may be compounded as the involved number of antennas increases, which may be particularly problematic for the massive antenna arrays targeted for next-generation technologies that will include tens or even hundreds of antenna elements.

A more particular implementation of beamforming is hybrid beamforming which may be more efficient in terms of cost and power consumption as compared to fully digital beamforming. Such hybrid beamforming configurations may utilize a limited number of RF chains (i.e. $N_{RF}<N_r$) and apply beamforming in both the baseband and RF domains. FIG. 2 shows a simplified hybrid beamforming architecture that similarly includes a four-element array 208; however, as shown in FIG. 2 RF system 204 includes only two RF chains ($N_{RF}=2$ and $N_r=4$) compared to the four-RF chain configuration of RF system 104.

Likewise to digital beamformer 102, hybrid beamformer 202 may digitally apply a complex beamforming weight vector $p_{BB}$ to baseband symbol s. As RF chain 204 includes only two RF chains, $p_{BB}$ may be only length-two, i.e.

$p_{BB}=[\alpha_1'\ \alpha_2']^T$; accordingly, digital beamformer may provide $\alpha_1$'s and $\alpha_2$'s to the RF chains of RF system 204. RF system 204 may then process the weighted symbols $\alpha_1$'s and $\alpha_2$'s and split the resulting radio symbols into two equivalent streams to each provide to a respective phase shifter of phase shifter array 206. Each phase shifter of phase shifter array 206 may then apply a respective complex weight $\beta_1$, $\beta_2$, $\beta_3$, or $\beta_4$ to the corresponding radio symbol. Phase shifter array 206 may then provide the resulting weighted symbols to antenna array 208 for transmission. The operation of digital beamformer 202 and phase shifter array 206 in matrix form as $p_{RF}p_{BB}$s where $p_{RF}=[\beta_1\ 0;\ \beta_2\ 0;\ 0\ \beta_3;\ 0\ \beta_4]$.

Similarly to the digital beamforming of FIG. 1, the hybrid beamforming architecture of FIG. 2 may adjust the beam pattern produced by antenna array 208 via manipulation of $p_{RF}$ and $p_{BB}$. As $p_{RF}$ may operate exclusively in the RF domain, hybrid beamformers may utilize low-complexity analog phase shifters for phase shifter array 206 due to the potential complications of using digital circuitry for RF domain processing. Although referred to as phase shifters, phase shifter array 206 may be able to apply both a phase shift and weighting factor; in other words, each $\beta_n$, n=1, . . . , $N_r$, may be a complex weight composed of both a phase shift and a gain factor, e.g. of the form $Ae^{j\theta}$ where A is the gain factor and $\theta$ is the phase shift.

Hybrid beamformers may thus apply beamforming in two (or more) stages: in the baseband domain in the form of $p_{BB}$ and in the RF domain in the form of $p_{RF}$. Accordingly, hybrid beamformers may dynamically control the overall beamforming effect by executing control over both the baseband and RF domains, which may include processing tasks to determine the direction of one or more target transmitters or receivers and calculate the appropriate beamforming weights for $p_{BB}$ and $p_{RF}$ to steer the beam towards the target points or to adjust a respective receive configuration of an antenna array. Hybrid beamformers may therefore include a control module configured to calculate the appropriate beamforming weights and indicate the calculated beamforming weights to the digital beamforming unit (e.g. digital beamformer 102 or 202) and the RF beamforming unit (e.g. phase shifter array 206). The digital and RF beamforming units may then be responsible for implementing the assigned beamforming weights.

As previously indicated, the digital beamforming unit may be implemented as a microprocessor, and accordingly may be configured to apply the assigned baseband beamforming weights $p_{BB}$ digitally, such as e.g. by multiplying a complex baseband symbol by the corresponding complex weights $\alpha$ of $p_{BB}$. The RF beamforming unit may be realized as an array of analog phase shifters, which may operate as either analog phase shifting circuitry or time-delay circuitry (in view of the time delay-phase shift equivalence for narrowband signals). In contexts where both gain and phase is used for RF beamforming, the RF beamforming unit may additionally include an array of gain elements such as variable gain amplifiers. Accordingly, a control unit may provide the complex weights $\beta$ of $p_{RF}$ to the analog phase shifters which may subsequently adjust the involved circuitry in order to apply the assigned phase shift and/or gain factor.

The control unit may thus specify an individual phase shift for each RF phase shifter, e.g. $\beta_n$ phase values for n=1, . . . , $N_r$. Assuming digital control, the control unit may represent each of the $N_r$ phase values with B bits, thus yielding a total number of bits $N_rB$ used for each beam pattern adjustment. As the amount of control signaling for directing the $N_r$ RF phase shifters increases with the size of the antenna array, massive array configurations may have substantial control signaling overhead involved in providing the NB control bits to the RF phase shifters. In particular for 'distributed' architectures with the RF modules located at a remote location relative to the baseband and control modules (e.g. a Remote Radio Unit (RRU) located at the top of tower compared to a ground-level Baseband Unit (BBU)), the infrastructure for supporting such high control overhead may be problematic.

Beamforming architectures in general may therefore utilize a "codebook" approach in order to reduce the control signaling overhead involved in controlling e.g. the RF phase shifters in Hybrid Beamforming. In such codebook schemes, the RF beamforming unit may include a memory that stores a codebook containing a plurality of codewords. Each codeword may specify a particular phase shift for a respective phase shifter of the RF phase shifter array to realize. The codewords of the codebook may be pre-configured in advance, and may each collectively specify a particular beam pattern that will be generated by the attached antenna array upon application of the corresponding phase shifts by the RF phase shifters. For example, each codeword may correspond to a different direction/angle, and accordingly selection of different codewords may cause the RF phase shifters to implement appropriate phase shifts in order to steer the beam pattern produced by the antenna array in different directions.

In order to simplify control signaling, each codeword in the codebook may be pre-assigned a codeword index that uniquely identifies the codeword within the codebook. Accordingly, as opposed to specifying an individual value for each phase shift, the control unit may instead identify a desired codeword (e.g. a codeword that matches the direction/angle of a target point) and specify the selected codeword to the RF phase shifter array by signaling the codeword index. The RF phase shifter array may receive the codeword index, retrieve the corresponding codeword from the codebook memory (i.e. retrieve the phase shifts that collectively compose the codeword), and apply the phase shifts of the assigned codeword at the phase shifters of the RF phase shifter array.

Figure 3:
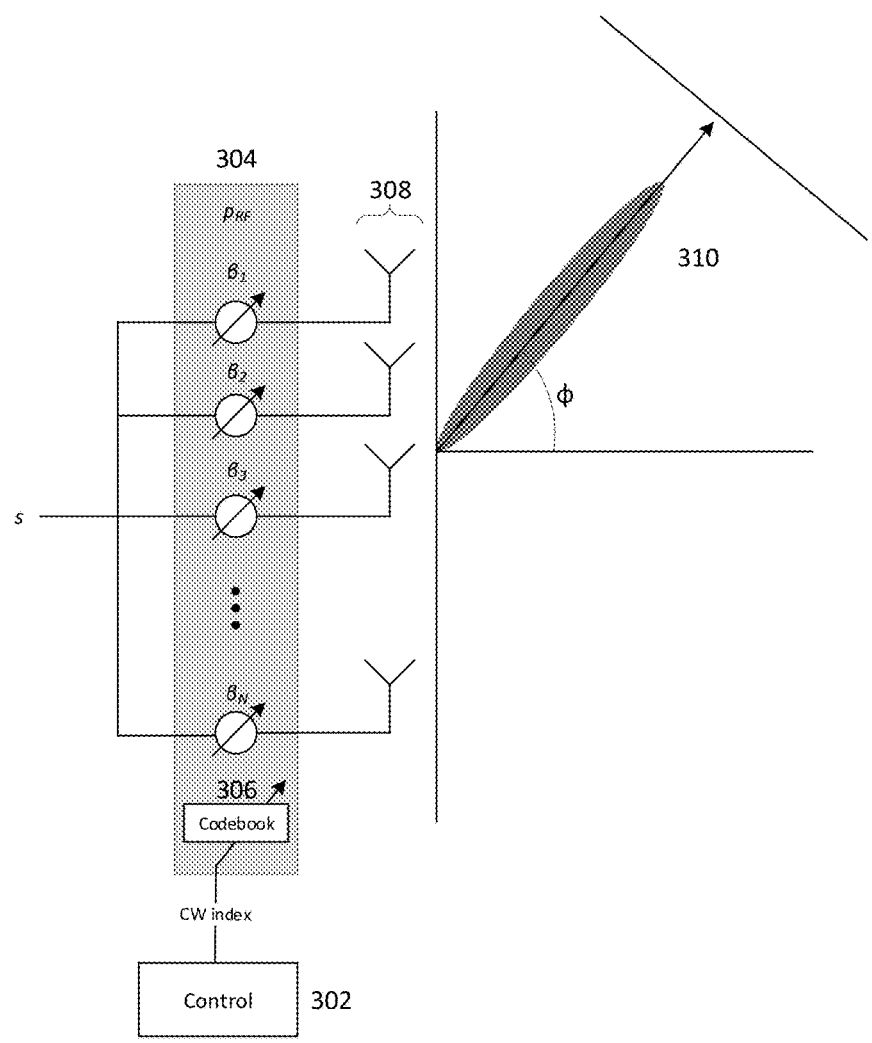
FIG. 3 shows an exemplary illustration of beamsteering for an antenna array.

FIG. 3 shows an exemplary implementation of a codebook-based control approach in which control circuit 302 may provide RF phase shifter array 304 with control signaling in the form of codeword (CW) indices. Again, while FIG. 3 may exemplarily illustrate a transmit beamforming context, skilled persons will appreciate the ability to likewise use an analogous implementation for receive beamforming, which may include combining the signals received at the antenna elements according to a complex weight array in order to adjust the received beam pattern. As previously detailed, control circuit 302 may select a codeword based on the direction/angle of a target point, such as by determining an optimal direction/angle estimation and selecting the codeword that provides a direction/angle that most closely matches the optimal angle/direction. RF phase shifter array 304 may then access codebook memory 306 to retrieve the corresponding codeword $\beta=[\beta_1\ \beta_2\ \ldots\ \beta_{N_r}]$, where each $\beta_n$, n=1, . . . , $N_r$ gives the assigned phase shift for the $n^{th}$ RF phase shifter of RF phase shifter array 304. RF phase shifter array 304 may then apply the phase shift values $\beta_n$, n=1, . . . , $N_r$, at each respective phase shifter in order to generate the antenna beam pattern corresponding to the specified codeword $\beta$ at antenna array 308.

The effectiveness of the codebook may depend to an extent on the total number of codewords in the codebook. For example, in a scenario where each codeword corresponds to a different steering angle of antenna array 308, a large number of codewords in codebook memory 306 may provide control circuit 302 with a relatively fine steering sensitivity due to the greater likelihood that an available codeword will closely match the optimal codeword. Such tighter sensitivity may come at the expense of larger storage requirements and higher control signaling overhead, as codebook memory 306 may store a substantial number of codewords and use more control signaling to differentiate between selected codewords. In contrast, a smaller codebook may lead to some performance degradation due to the reduced sensitivity but also use less memory and control signaling.

As beamforming relies on manipulating antenna signals to create specific patterns of constructive and destructive interference, the beamforming weights of each codeword may depend on the arrangement of the elements of antenna array 308. For example, antenna array 308 may be arranged as a uniform linear array; in other words, all elements of antenna array 308 may lie on a single substantially straight line and may be uniformly spaced by a spacing distance d, i.e. each element may be separated from its neighboring elements by distance d.

In such a uniform linear array configuration, control circuit 302 may employ an antenna array steering technique known as progressive phase shifting to steer antenna beam 310 produced (or received) by antenna array 308 in a particular angular direction $\phi$ relative to antenna array 308. In order to produce a maximum beamgain at direction $\phi$, the signals emitted by each element of antenna array 308 may constructively interfere at each point along the wavefront perpendicular to direction $\phi$ (as shown in FIG. 3), i.e. each signal emitted by each element of antenna array 308 may have the same phase along the wavefront perpendicular direction $\phi$. As each element of antenna array 308 may be located at variable distances from the common wavefront trigonometrically related to the angle $\phi$ and spacing d, the signal provided to each antenna element may be shifted by the phase shifters of RF phase shift array 308 by a different amount in order to produce emitted signals with identical phase at the wavefront (or to adjust a receive configuration of the antenna array in accordance with a signal received at angle $\phi$). Given the uniform spacing d between the elements of antenna array 304, the difference in the phase shifts between each element may be given as $\theta = -kd \sin(\phi)$, where $$k = \frac{2\pi}{\lambda}$$

is the wavenumber. Accordingly, antenna array 308 may produce a combined (transmit or receive) beam with maximum beamgain in direction $\phi$ if the phase applied by each phase shifter of phase shifter array 304 is separated by $\theta$ from the phase applied by its neighboring phase shifters; in other words, if $|\angle \beta_n - \angle \beta_{n+1}| = \theta = kd \sin(\phi)$ for $n=1, \ldots, N_r-1$ (where $\angle \beta_n$ gives the phase of $\beta_n$).

Accordingly, control circuit 302 may select a codeword from the codebook that satisfies the requirements of progressive phase shifting for $\phi$ to steer antenna array 308, i.e. a codeword $\beta$ containing N phase values $\beta_n$ in which each $\beta_n$ is separated from $\beta_{n\pm 1}$ by a phase shift of $\theta$. In a simplified exemplary codebook approach with e.g. 1 degree resolution and 120 degree range (e.g. for a sectorized antenna array adapted for a three-sector configuration), the codebook may contain e.g. 120 codewords where each codeword provides vector $\beta$ of phase shifts that satisfy the constraints of progressive phase shifting for each of $\Delta = \{-60, -59, \ldots, 58, 59\}$ (in degrees); in other words, each codeword $\beta$ is tailored to cause antenna array 308 to steer beam 310 in a particular angular direction in the range of $-60, -59, \ldots, 58, 59$ (degrees). In order to assign a codeword for $\phi$ to RF phase shifter array 304, control circuit 302 may identify $\phi'$ (the actual angular direction of the target point, determined e.g. based on the direction of a target transmitter or receiver) and compare $\phi'$ to the steering directions that each codeword of the codebook is optimized for. Control circuit 302 may select the codeword that corresponds to a steering angle $\phi$ that most closely matches $\phi'$ (e.g. quantize $\phi'$ to the 1 degree resolution grid range to obtain $\phi$), identify the codeword index of the codebook that uniquely identifies the selected codeword, and provide the codeword index to codebook circuit 306. Codebook circuit 306 may then access the codebook memory to retrieve the codeword $\beta$ corresponding to the specified codeword index and apply the beamforming weights $\beta_1, \ldots, \beta_{N_r}$ to RF phase shifter array 304. RF phase shifter array 304 may then apply the assigned phase shifts to a transmit symbol s (other signal path circuitry and components are omitted in FIG. 3 for simplicity) and transmit (or receive) the resulting signals with antenna array 308. The combined beam pattern produced (received) by antenna array 304 may thus produce (receive) a focused (receive) beam with maximum beamgain in direction $\phi$.

As mentioned above, for example in Massive MIMO and mm-Wave communications a large number of antennas in antenna arrays and correspondingly large numbers of data interfaces (IO links) from analog-to-digital converter (ADC) output (RFIC) to digital baseband processor may cause issues as regards power consumption. An approach for reducing the number of IO links may rely on spatial compression of ADC output signals, e.g. making use of a strong directivity of mm-Wave channels. However, in realistic multi-cell environments a desired signal is often superimposed with intra-cell/inter-cell interference and/or out-of-band blockers at the digital baseband input. Thus, taking into account a more realistic environment, digital baseband processing may help to distinguish a desired signal from interference which may be more difficult without digital baseband processing since the nature of interference is uncontrollable, dynamic, and time-varying instead of static.

Thus, various aspects of the present disclosure provide a two-stage space-domain data compression algorithm for beamforming devices. On a high level, the two-stage space-domain data compression algorithm includes two phases or stages. In various aspects, the first stage of the two-stage space-domain data compression algorithm is to compress space-domain ADC outputs based on a beamforming codebook, such as for example a Discrete Fourier Transform (DFT) codebook or to compress an antenna array output before ADC. The first stage is responsible for holding dominant receive (Rx) directions potentially coming from multiple serving and neighboring cells. The first phase or stage thus can be referred to as a sector sweeping phase. Holding only dominant receive directions, the first stage may in certain aspects reduce the number of contributing I/O links.

In various aspects, the second phase or stage of the two-stage space-domain data compression algorithm takes into account the influence of a multi-cell environment and is to distinguish which Rx direction a receiver should tune to and to refine the compression matrix. In certain aspects, the second stage may contribute to a reduction of contributing I/O links, as it is capable of reducing the dominant receive (Rx) directions held in the first stage to directions dominantly including a signal received from a desired transmitter. The second stage may be referred to as data communication phase.

In various aspects, the two-stage compression may provide ability to refine a received signal to dominant components dominantly stemming from a desired transmitter. Thereby, the two-stage compression may in various aspects allow a number of available I/O links not dominantly related to the desired transmitter to be turned off thereby reducing power consumption. Thus, on the one hand, in various aspects, the two-stage space-domain data compression can contribute to a reduced power consumption as it may help to reduce a number of I/O interface links. On the other hand, in various aspects, the two-stage space-domain data compression enables mitigation of inter/intra-cell interference in multi-cell environments. Thereby, in various aspects the two-stage space-domain data compression may provide a higher compression efficiency as approaches not taking into account multi-cell environments. In various aspects, the concept of the two-stage space-domain data compression may further be implemented for improving sector sweeping performance.

As mentioned, in certain aspects, the first stage of the two-stage space-domain data compression algorithm may compress space-domain ADC outputs based on a beamforming codebook. Thereby, an RF codebook can generally be represented as a matrix, where each column specifies a transmit or receive pattern or RF beamforming vector. For example, in case of an M×N codebook matrix, N is the number of columns, where each column corresponds to a codeword and M is the number of entries per codeword. Each column (codeword) may correspond to a phase and/or amplitude of an antenna element to generate a specific beam. Such codebook column may thus in general correspond to a receive configuration of an antenna array of a receiver (e.g. a wireless communication device such as a mobile terminal) corresponding to a respective receive direction. In analogy, such codebook column may in general correspond alternatively or in addition to a transmit configuration of an antenna array of a transmitter (e.g. a base station) corresponding to a respective transmit direction. Skilled persons will appreciate that various codebooks have been defined in the art for given system circumstances. In an exemplary aspect, entries of an $N_r$-point DFT codebook ($N_r$ being a number of antennas in an antenna array) can be defined as $$F(m, i) = \frac{1}{\sqrt{M}} e^{-j2\pi \frac{(m-1)(i-1)}{M}}, \forall m \in M, \forall i \in N_r.$$

In the following, $F_{rx}$ may correspond to a receive codebook matrix, with $f_{rx,i}$ denoting an i-th column. In analogy, $F_{tx}$ may correspond to a transmit codebook matrix, with $f_{tx,i}$ denoting an i-th column. In general, the codebook may include $N_r$ columns corresponding to $N_r$ antenna elements. Further, the codebook can also be oversampled, i.e. the index i can be taken from a larger set $N > N_r$. Application of the more specific DFT codebook may in various aspects provide the effect of achieving a beneficial antenna gain at a given beam direction.

Figure 4:
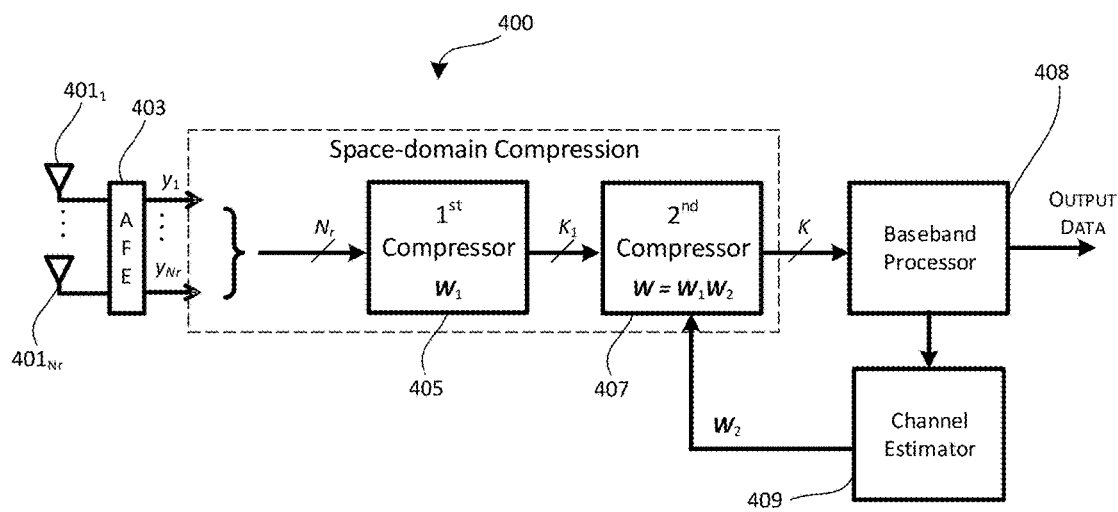
FIG. 4 shows an exemplary internal configuration of a wireless communication device related to two-stage compression.

FIG. 4 shows an exemplary internal configuration of a wireless communication device 400 related to two-stage compression in accordance with various aspects of the present disclosure. As the illustrated depiction of FIG. 4 is focused on the two-stage compression, for purposes of conciseness, FIG. 4 may not expressly show certain other components of wireless communication device 400. As shown in FIG. 4, in some aspects, the wireless communication device 400 may include an antenna array including individual antennas $401_1$ to $401_{N_r}$, an analog/RF front end 403, first compressor 405, second compressor 407, baseband processor 408 and channel estimator 409. Each of first compressor 405, second compressor 407, baseband processor 408 and channel estimator 409 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. First compressor 405, second compressor 407, baseband processor 408 and channel estimator 409 can therefore each be implemented as separate hardware and/or software components, or one or more of first compressor 405, second compressor 407, baseband processor 408 and channel estimator 409 can be combined into a unified hardware and/or software component (for example, a hardware-defined circuitry arrangement including circuitry to perform multiple functions, or a processor configured to execute program code that defines instructions for multiple functions).

As show, the wireless communication device 400 includes the array of antennas $401_1$ to $401_{N_r}$ for receiving a radio signal for example from a base station. As explained above in connection with FIGS. 1 to 3, the analog/RF front end 403 can apply respective antenna weights for each antenna $401_1$ to $401_{N_r}$ to set a respective receive beamforming configuration (or receive beams) optimized for a corresponding receive direction. A thus received signal y including components $y_1$ to $y_{N_r}$, each component corresponding to a respective antenna element, is provided to the first compressor which is configured to determine a first compression operator based on a set of beamforming configurations for the antenna array, and to apply the first compression operator to the radio signal to obtain a first compressed signal. In certain aspects, the first compressor may be configured to select the set of beamforming configurations based on received powers for each beamforming configuration. In other words, in certain aspects, for a given received signal, e.g. a transmitted (Tx) sector-sweeping beam b received from a base station, the analog/RF front end 403 may sweep or switch through a set of receive configurations, e.g. by switching through a set of codewords included in a corresponding codebook stored at a dedicated memory (not shown in the figure) of the wireless communication device 400. The received signal may then be temporarily stored for each of the receive configurations or beamforming codewords e.g. in a buffer memory. The first compressor may determine e.g. a number of $K_1$ codewords which correspond to the $K_1$ strongest directions, i.e. which correspond to the $K_1$ receive configurations for which the received signal was received at highest receive power, and determine a first compression operator, e.g. a first compression matrix $W_1$, as a matrix including (only) columns corresponding to these beamforming codewords. The first compressor 405 may then be configured to apply the first compression operator to the received signal y by multiplying the matrix $W_1$ representing the first compression operator with the received signal vector $y = [y_1 \text{ to } y_{N_r}]^T$.

As further shown in FIG. 4, the resulting first compressed signal is fed to the second compressor 407 which is configured to apply a second compression operator to the first compressed signal to obtain a second compressed signal. As shown, the second compression operator $W_2$ is received at the second compressor 407 from the channel estimator 409 which is configured to determine the second compression operator based on a previously received signal. Thereby, for a first received signal or a set of first received signals, the second compression operator can be set to the unit matrix until the channel estimator 409 has determined a second compression operator $W_2$ for the first time. Alternatively, for the first received signals, an initial second compression operator can be prestored and fed to the second compressor for compression of the first received signal or the first set of received signals.

To determine the second compression operator $W_2$, in various aspects, the channel estimator 409 is configured to determine a channel covariance of the radio signal, determine at least one eigenvector of the channel covariance to obtain a second compression operator, and provide the second compression operator to the second compressor. In various aspects, the baseband processor 408 is configured to receive the second compressed signal from the second compressor 407 and to process the second compressed signal to obtain output data for further processing at the baseband of the wireless device or for higher layer processing. The compressed output data may be beneficial in particular for further baseband processing as—from a baseband perspective—it reduces the number of antennas and also suppresses inter/intra-cell interference. A reduction of the number of antennas may in certain aspects help to reduce complexity in baseband processing. Suppressing inter/intra-cell interference may in certain aspects contribute to improved channel estimation and data demodulation.

Figure 5:
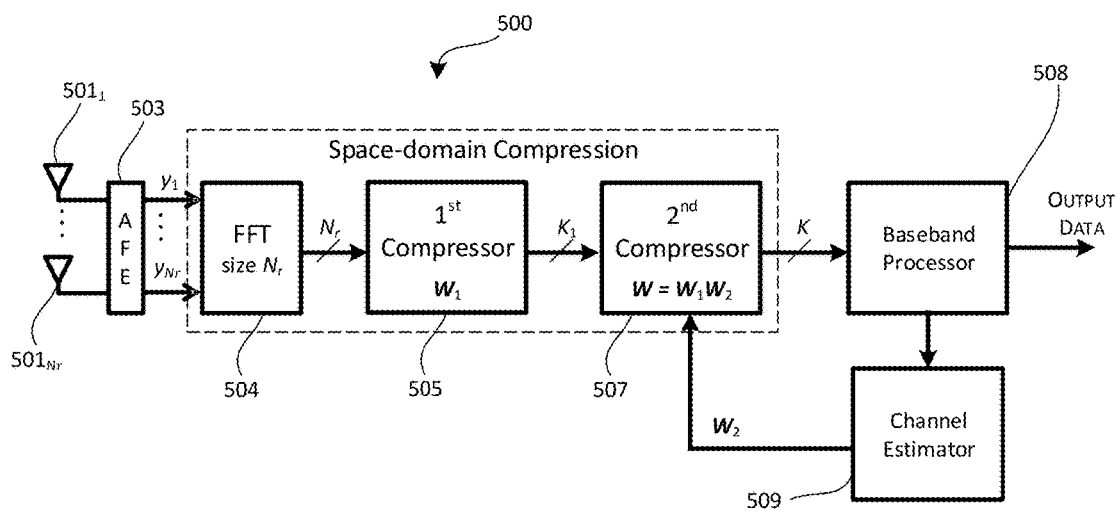
FIG. 5 illustrates an example of the wireless communication device shown in FIG. 4.

FIG. 5 illustrates an example of the wireless communication device shown in FIG. 4. In addition to the components of FIG. 4, the wireless communication device 500 of FIG. 5 includes a fast Fourier transformer 504. As illustrated above in relation to FIG. 4, generally, in order to express the above two-stage compression method, a general space-domain compression matrix denoted by W can be represented as a product of two components:

$$W = W_1 W_2 \in \mathbb{C}^{N_r \times K}$$

where K is the number of active I/O links and $K_1$ is the number of all available I/O links satisfying $K_1 \geq K$. The first and second compression operators are given by $W_1 \in \mathbb{C}^{N_r \times K_1}$ and $W_2 \in \mathbb{C}^{K_1 \times K}$, respectively. For a given Tx sector-sweeping beam b, in certain aspects, data compression can be as described exemplarily with reference to FIG. 5. Having received the $N_r$-dimensional complex-valued quantized signal vectors (each component of y can be represented by two components of a complex number), i.e. the received radio signal, from the analog/RF front end (AFE) 503, the fast Fourier transformer 504 of the wireless communication device 500 performs a fast Fourier transform (FFT) to determine an average received power (denoted by $v_i$) codeword or receive configuration of the antenna array. In the example shown in FIG. 5, a DFT codebook is used such that the fast Fourier transformer 504 exemplarily determines the average receive power per DFT receive beam:

$$v_i = \frac{1}{T} \sum_{t=1}^{T} |f_{rx,i}^H y(t)|^2, \; i \in [1:N_r]$$

where averaging in terms of t can be over time and/or subcarrier, and where $f_{rx,i}$ is the ith column of the $N_r$-point DFT matrix $F_{rx}$ ("rx" indicating the "receive" direction). The first compression stage is to find $K_1$ strongest directions among $N_r$ DFT beams. In other words, based on the output of the fast Fourier transformer 504, the first compressor 505 may in certain aspects be configured to select the set of beamforming configurations based on received powers for each beamforming configuration of the set of beamforming configurations. As a result, the first compressor can determine the first compression operator in certain aspects as $W_1 = F_{rx}[:, I]$, where $I = \{i: K_1$ largest $v_i$'s$\}$. In this notation, ":" denotes "all rows" and I defines the columns (as e.g. used in the computer program "Matlab" known to the skilled person), such that $W_1$ is represented by a matrix formed (only) by columns of the DFT codebook corresponding to the $K_1$ directions having the largest received power. As explained above, even though of being beneficial in terms of antenna gain at a given beam direction, the used DFT codebook is used for illustrative purposes and be replaced by different codebooks and/or can be oversampled. In various aspects, the operation of the first compressor may be improved by using an oversampled DFT codebook. For example, by twofold oversampling, two sets of DFT codebooks can be constructed by spatially oversampling. In these aspects, the first compressor may be configured to compare average powers corresponding to the two DFT codebooks and to select the codebook providing larger power.

As mentioned above, the quantized received signal vector y(t) may in certain aspects be a mixture of a desired signal and in-band/out-of-band interference. The first stage compression may be unable to differentiate a desired signal from a received signal. In order to address this, the present disclosure provides the second compression stage which is based on a feedback from the baseband processing module of the wireless communication device. In other words, to potentially mitigate adverse effects due to interference while avoiding power-heavy interference calculations, the two-stage method includes two phases in various aspects. As explained above, a first phase is a sector sweeping phase provided upstream to a data communication phase. In the first phase, only partial compression using $W_1$ is conducted. A decision which Rx directions are directions corresponding to a desired signal is deferred to the baseband processor and the second stage. In the data communication phase, the baseband module can in certain aspects determine which Rx directions should be used for demodulation taking into account actions carried out by the wireless communication device such as handover, dual connectivity, or CoMP. Thus, in general, in various aspects, the second compression stage of the two-stage compression method may be performed at the digital baseband of the wireless communication device. In particular, in various aspects, the channel estimator 409 and the baseband processor 408 may be implemented in the digital baseband of the wireless communication device 400.

In the second phase of the two-stage compression, in various aspects, the channel estimator may be configured to determine a channel covariance of the radio signal and to determine at least one eigenvector of the channel covariance to obtain a second compression operator. To this end, in various aspects, a wideband average may first be computed across subcarriers of a reference (e.g. CSI-RS) or pilot signal received from a target cell. In other words, the channel estimator may be configured to compute a covariance matrix $\tilde{R}$ (only) on subcarriers of a received reference or pilot signal:

$$\tilde{R}=E[\tilde{y}_{pilot}(f)\tilde{y}_{pilot}(f)^H]$$

where $\tilde{y}_{pilot}=W_1^H H(f)b+W_1^H z(f)$, $[\ ]^H$ denotes the conjugate transpose of a vector or matrix and $E[\ ]$ denotes the expectation value. In other words, $\tilde{y}_{pilot}(f)$ is a vector of received reference or pilot symbols, where each vector element is the pilot symbol corresponding to a respective one of the $K_1$ codewords in $W_1$ (e.g., received from a respective one of the $K_1$ directions represented in $W_1$). Covariance matrix $\tilde{R}$ may therefore be a $K_1 \times K_1$ channel covariance matrix representing the spatial correlation between the reference or pilot signals received with each of the $K_1$ codewords of $W_1$. Having calculated $\tilde{R}$ from the received reference signal $\tilde{y}_{pilot}$, the second compression module is in certain aspects configured to perform an eigenvalue decomposition of $\tilde{R}$, to determine the second compression operator:

$$\tilde{R}=U\Lambda U^H,$$

In this expression, as will be appreciated by a skilled person, U is a transformation operator and $\Lambda$ is a diagonal matrix with the individual eigenvalues $\lambda_i$ forming the diagonal. As it will be appreciated by a skilled person, each eigenvalue $\lambda_i$ corresponds to a column of the transformation matrix U, i.e. to an eigenvector. Given this decomposition, the second compressor is in various aspects configured to determine the second compression operator (or matrix) as $W_2 = U[:,1:K]$. Thereby, the expression $U[:,1:K]$ denotes the first K columns of U, i.e. this expression represents a matrix formed by K eigenvectors of $\tilde{R}$. In various aspects of the present disclosure, the channel estimator is configured to determine the channel covariance based on a $K_1$-dimensional received reference or pilot signal and to determine a set of K eigenvectors (equivalently, strongest eigen-directions) of the determined channel covariance $\tilde{R}$, where the set is chosen such that the eigenvectors correspond to the K largest eigenvalues of the channel covariance. In other words, subcarriers of a received signal may be collected that contain pilot or reference symbols. A channel covariance is then determined based on the reference or pilot symbols. The determined channel covariance corresponds to a covariance of the $K_1$ directions or codewords in the first compression operator $W_1$. Thereby, each column of U corresponds to an angular receive direction of the antenna array of the wireless communication device. The columns of U thus correspond to the eigendirections of the channel covariance corresponding to a received reference or pilot signal.

In sum, the first stage compression W1 in fact projects the received signal onto the entire subspace represented by the columns of U containing both desired signal and all dominant inter/intra-cell interference. Multiplying W1 by W2 can then be interpreted as concatenating the projection (first compression) of $y_{pilot}$ onto the entire subspace, yielding $\tilde{y}_{pilot}$. Further projecting (second compression) along the dominant eigenmodes of $\tilde{R}$—further steers and restricts the receive beamforming directions toward the desired signal, thus mitigating interference as well as further reducing the number of activated IO links, i.e., from the eigen-sub space dimension ($K_1$) of signal plus interference to that (K) of signal only.

As shown in FIGS. 4 and 5, having determined the second compression operator $W_2$, the second compressor is configured to provide the second compression operator to the second compressor. In other words, the channel estimator 409, 509 is configured to feed $W_2$ back to the second compressor 407, 507, as shown in FIGS. 4 and 5.

In various aspects, it may be assumed that beamformed channels e.g. in mm-Wave systems are frequency flat. In these aspects, the two-stage compression can be further improved. By processing a control channel at the digital baseband, the baseband processor can be configured to determine a number of streams transmitted from a base station to the wireless communication device. In various aspects, if the number S of streams is smaller than a number of available I/O links, the baseband processor can in these aspects be configured to compute a corresponding wideband digital beamformer and provide the wideband digital beamformer to the second compressor to reduce the number of I/O links down to the number S of streams transmitted by the base station. In other words, the first compressor may reduce a space of a received signal to a subspace including the desired signal and all dominant inter/intra-cell interference. Using S and the above described eigenvalue decomposition of $\tilde{R}$, the second compressor can distinguish the particular subspace of the desired signal from the subspace received from the first compressor. Multiplying $W_1$ by $W_2$ the receive (Rx) beamforming directions can be focused on those of the desired signal, thus mitigating interference.

Figure 6:
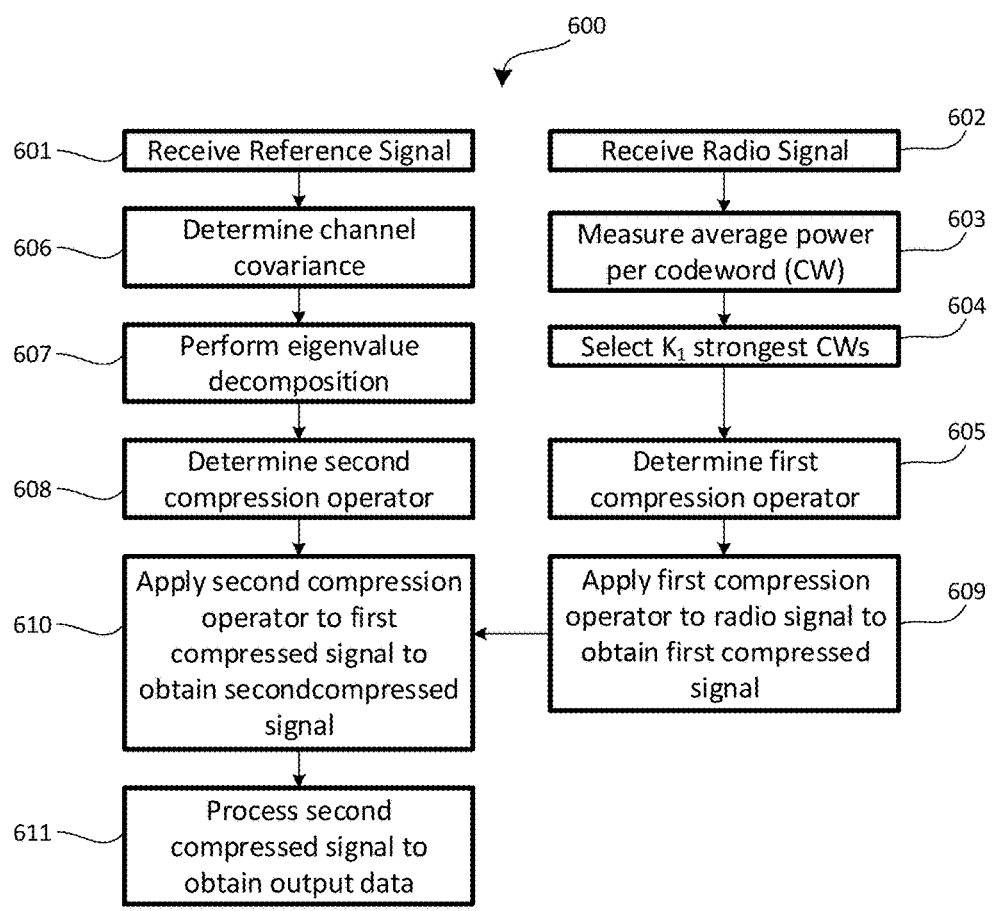
FIG. 6 shows an exemplary method which can be carried out employing the components shown e.g.

FIG. 6 shows exemplary method 600 which can be carried out employing the components shown e.g. in FIGS. 4 and 5. As illustrated, at stages 602, the wireless communication device 400, 500 receives a radio signal which can for example be a data signal or a control signal. At stages 603 to 605, the wireless communication device determines a first compression operator based on a set of beamforming configurations for the antenna array of the wireless communication device. As explained above, in various aspects, the set of beamforming configurations may correspond to a set of beamforming codewords forming a codebook, such as for example a DFT codebook. As explained later, in certain aspects, the set of beamforming configurations may be determined alternatively using an analog RF beamformer.

As shown in FIG. 6, at stage 603, the wireless communication device may determine an average received power per receive configuration, i.e. per codeword or per set of antenna weights applied to the respective antennas forming the antenna array of the wireless communication device, for the received radio signal. Based thereon, at stage 604, the wireless communication device selects the $K_1$ strongest directions, e.g. selects the $K_1$ codewords for which the received radio signal shows the respectively largest received power. Thereby, in various aspects, $K_1$ may be a predetermined system or design parameter which may be heuristically determined e.g. based on numerical simulations or tests. Alternatively, in different aspects, $K_1$ may correspond to a threshold power. In other words, in these alternative aspects $K_1$ may be set such that the selected $K_1$ codewords correspond to the directions for which an average received power per codeword is above a predetermined threshold value. This threshold value may similarly be a system design parameter determined based on numerical simulations or tests. Based on the selected $K_1$ codewords, a first compression operator can be determined at stage 605, which in various aspects may correspond to a matrix including (only) columns corresponding to the selected $K_1$ codewords. As explained in detail above, in a particular aspect, the codebook may be a DFT codebook such that the first compression operator $W_1$ may be represented by a matrix with columns formed by the $K_1$ strongest columns of an Nr-point DFT matrix.

Thus, in a first stage of the two-stage compression method provided by various aspects of the present disclosure, a first compression operator is determined based on received power per receive configuration of the at least one antenna array of the wireless communication device. In order to be able to take into account an actual multi-cell environment, and on the one hand focus the compression result on the actually desired signal while on the other hand mitigating adverse effects of interference, various aspects provide a second stage of the two-stage compression method which is based on a received reference or pilot signal. Thereby, in various aspects, a determination of a second compression operator is performed at the baseband of the wireless communication device which provides computational resources being optimal for the respective calculations. In various aspects, only the second stage of the two-stage compression method is performed at the baseband, which contributes to power saving and energy efficiency.

Referring back to FIG. 6, at stage 601, the wireless communication device receives a reference signal such as a CSI-RS reference signal or a pilot signal. In accordance with aspects of the present disclosure, the wireless communication device can receive any reference signal or pilot signal in accordance with a particular technology, which is a signal known to the wireless communication device, e.g. a mobile terminal, and to a corresponding transmitter of the reference signal, e.g. a corresponding base station in advance.

It is noted that e.g. as long as no reference signal is received, the second compressor shown in FIGS. 4 and 5 may be bypassed by setting the second compression operator as identity operator, e.g. represented by a matrix filled with ones. Alternatively, an initial second compression operator may be predefined and stored at the wireless communication device to be used until a reference signal is received and processed as explained in the following. Having received the reference signal at stage 601, at stages 606 to 608, which may be performed before, after, or simultaneously with any one or all of stages 602 to 605, the wireless communication device determines the second compression operator. To this end, in various aspects of the present disclosure, the wireless communication device determines a channel covariance of the radio signal. As explained above, thereby, the wireless communication device may determine $\tilde{R}$ being represented by a covariance matrix restricted to the subcarriers of the received reference or pilot signal. Having received the reference signal, $\tilde{R}$ can be calculated by calculating the expected value of the matrix $\tilde{y}_{pilot}(f)\tilde{y}_{pilot}(f)^H$. Having determined $\tilde{R}$ at stage 606, the wireless communication device determines at least one eigenvector of the channel covariance to obtain a second compression operator. Thus, as exemplarily illustrated in FIG. 6, at stage 607, the wireless communication device may perform an eigenvalue decomposition of $\tilde{R}$ by calculating $\tilde{R}=U\Lambda U^H$, where respective columns of the transformation matrix U correspond to individual eigenvalues $\lambda_i$ of the eigenvalue matrix $\Lambda$. Based on the eigenvalue decomposition, at stage 608 the second compression operator is determined. To this end, in various aspects, a set of K columns of the transformation matrix U may be determined which correspond to the K largest eigenvalues. The second compression operator may in various aspects then be represented by a matrix formed by (only) those columns of U. These columns may represent the K dominant receive directions or receive configurations of the received reference signal. At stage 609, the wireless communication device applies the first compression operator to the radio signal to obtain a first compressed signal. At stage 610, the wireless communication device further applies the second compression operator to the first compressed signal to obtain a second compressed signal. At stage 611, the wireless communication device, e.g. the base band processor, processes the second compressed signal to obtain output data.

As explained above, various aspects of the present disclosure provide a two-stage compression method which may be applied for different beamforming architectures. While the above explains the concept of the two-stage compression in a fully digital beamforming context, the two-stage compression method can be employed similarly in further beamforming architectures such as analog, fully connected hybrid, subarray type hybrid beamforming architectures. In the latter cases, the first stage of the two-stage compression method can be performed by an analog RF beamforming stage of the analog/hybrid architecture. Thereby, an analog RF beamformer may in various aspects be configured to select a set of $K_1$ strongest receive directions in the first stage of the two-stage compression to reduce the number of active IO links. In other words, as an alternative to a fully digital beamformer, in various aspects, an analog RF beamformer may be configured to determine a first compression operator based on a set of beamforming configurations for the antenna array, and to apply the first compression operator to the radio signal to obtain a first compressed signal.

Figure 7:
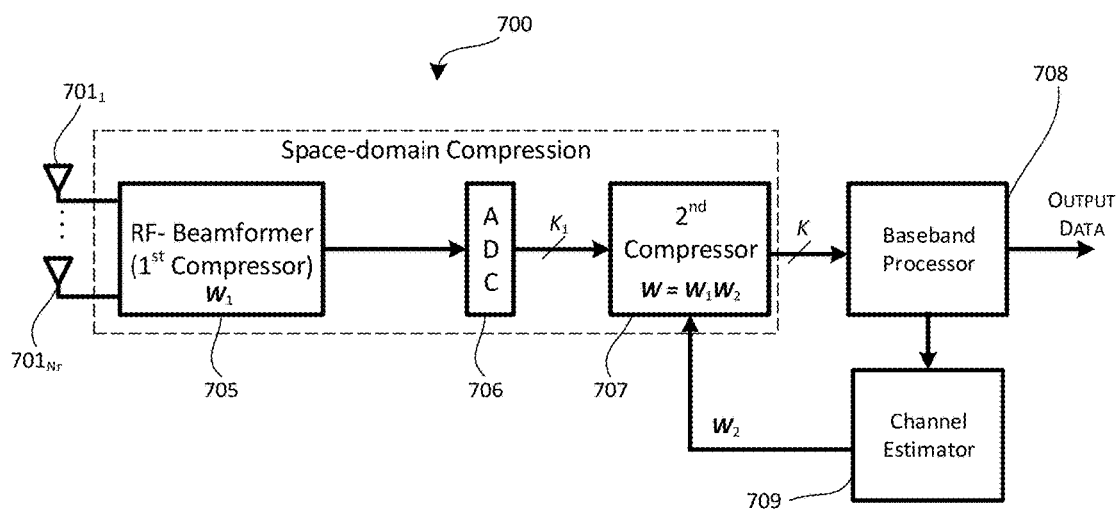
FIG. 7 illustrates a concept of applying an exemplary two-stage compression method in a wireless communication device.

FIG. 7 illustrates the concept of applying the two-stage compression method in a wireless communication device 700 in accordance with various aspects to a beamforming architecture further to a fully digital beamforming architecture showing an exemplary block diagram of an analog/hybrid beamforming architecture to which the two-stage compression method is applied. As the illustrated depiction of FIG. 7 is focused on the two-stage compression, for purposes of conciseness, FIG. 7 may not show certain other components of wireless communication device 700. As shown in FIG. 7, in some aspects, the wireless communication device 700 may include at least one antenna array including individual antennas $701_1$ to $701_{Nr}$ as in the case of FIGS. 4 and 5. In the case of FIG. 7, the analog/RF front end 403 takes the function of the first compressors 405, 505 in the form of RF Beamformer (first compressor) 705. The wireless communication device 700 may further include a set of $N_r$ analog to digital converters (ADC) 706, second compressor 707, baseband processor 708 and channel estimator 709. Each of ADC 706, second compressor 707, baseband processor 708 and channel estimator 709 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. ADC 706, second compressor 707, baseband processor 708 and channel estimator 709 can therefore each be implemented as separate hardware and/or software components, or one or more of first compressor 705, second compressor 707, baseband processor 708 and channel estimator 709 can be combined into a unified hardware and/or software component (for example, a hardware-defined circuitry arrangement including circuitry to perform multiple functions, or a processor configured to execute program code that defines instructions for multiple functions).

As can be taken from FIG. 7, a two-stage compression method performed with the components shown in this figure may be similar to a method carried out with the components shown in FIGS. 4 and 5. However, in the case of FIG. 7, the analog RF Beamformer 705 performs the first stage compression. In this case, a set of $K_1$ phase shifting array vectors (i.e. receive configurations of the antenna array formed by antennas $701_1$ to $701_{N_r}$) corresponding to $K_1$ largest received powers of a given received radio signal form the columns of a matrix $W_1$ representing the first compression operator. After analog to digital conversion, the radio signal compressed using the first compression operator (first compressed signal) is fed to the second compressor 707 which performs second stage compression in correspondence with the compression performed by second compressors 407, 507. The baseband processor 708 and the channel estimator 709 perform operations in correspondence with the baseband processors 408, 508 and the channel estimators 409, 509 discussed in the context of FIGS. 4 and 5. Hence, an overall beamforming matrix before baseband digital beamforming can be represented by $W=W_1 W_2$ as in the fully digital architecture discussed in the context of FIGS. 4 and 5. In this case, in various aspects, the second stage compression illustrated in FIG. 7 may be capable of refining receive (Rx) directions and to suppress interference in a large-scale (long-term/wideband) sense based on the $2^{nd}$ order channel statistics. In order to further take into account further interference contributions, the baseband processor 708 may in various aspects be configured to perform baseband digital beamforming including coherent combining of analog beams and interference suppression based on estimates of instantaneous channel realizations.

In various aspects, the two-stage compression method may be employed to support beam alignment to improve performance of beam management. To this end, in various aspects, the wireless communication device may be configured to refine the selection of Tx and Rx beams using an alternating optimization algorithm.

Figure 8:
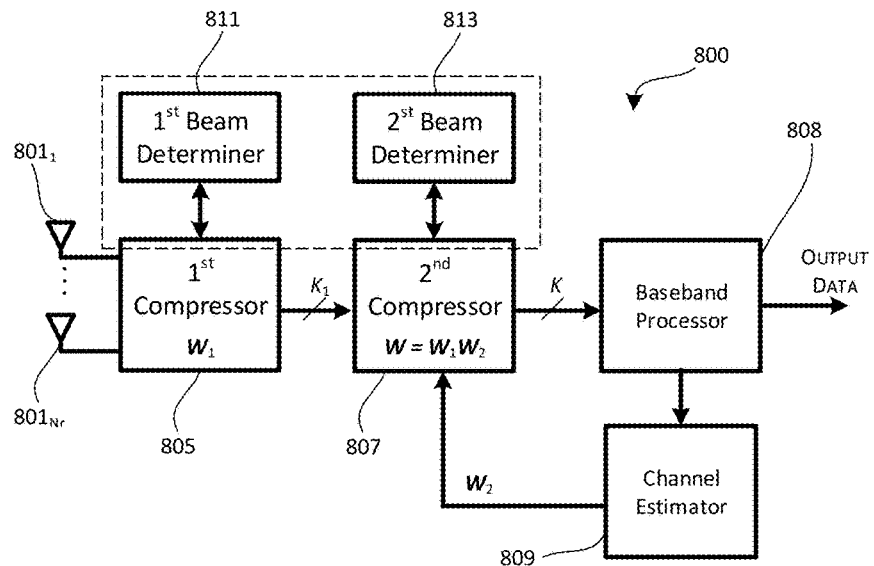
FIG. 8 shows an exemplary wireless communication device further including a first and second beam determiner.

Refining the selection of Tx and Rx beams is explained in the following with reference to FIGS. 8 and 9. In FIG. 8, a first compressor 805 may correspond to the first compressor 405, 505 as illustrated in FIGS. 4 and 5 or may correspond to an RF Beamformer (first compressor) 705 as illustrated in FIG. 7. The second compressor 807, the baseband processor 808 and the channel estimator 809 correspond to the respective components as illustrated in FIGS. 4, 5 and 7. As illustrated in FIG. 8, the wireless communication device 800 may further include a first beam determiner 811 and a second beam determiner 813, the function of which are explained using the exemplary flow chart of FIG. 9 which shows exemplary method of an alternating beam alignment.

Figure 9:
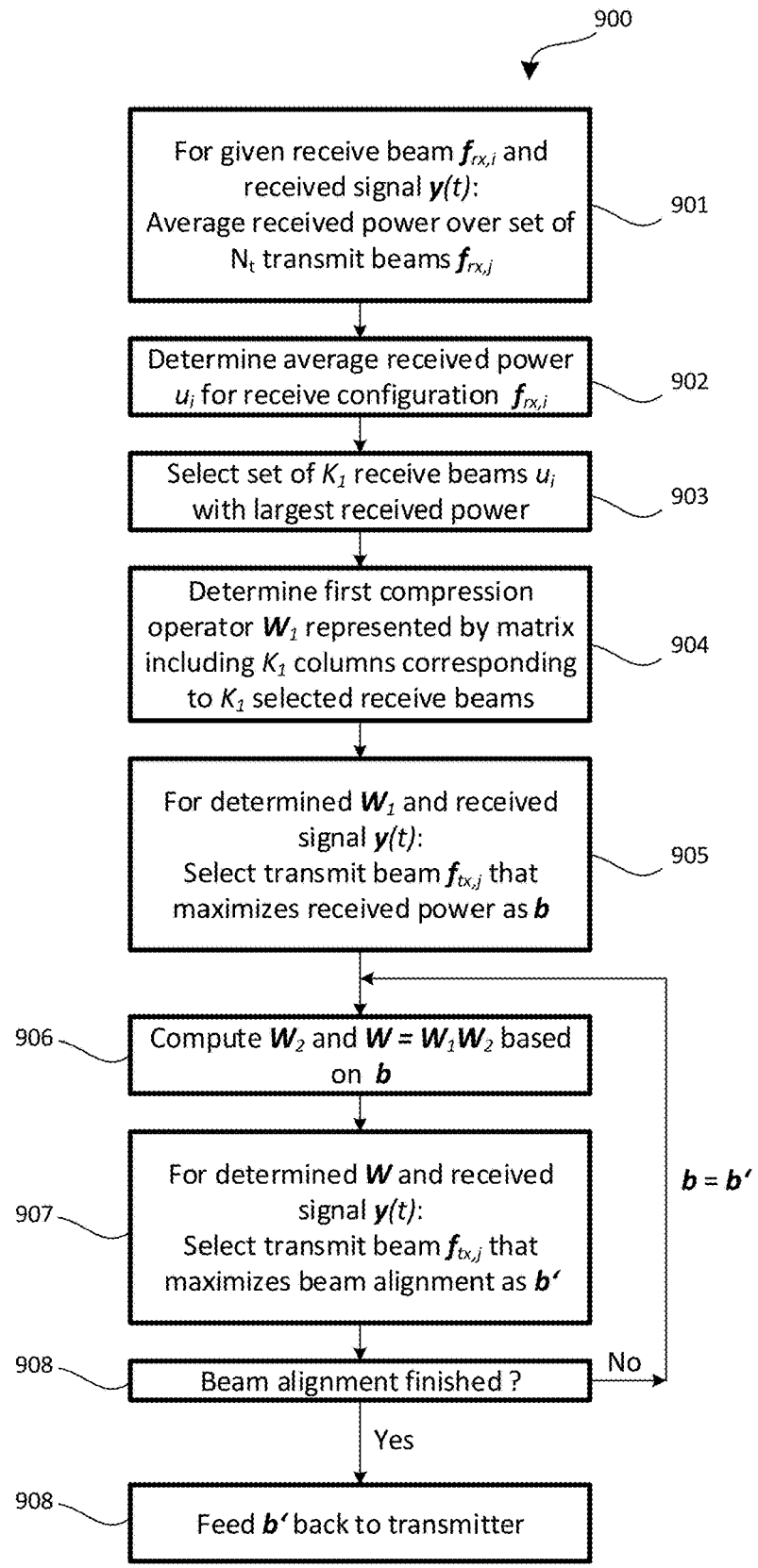
FIG. 9 illustrates an exemplary method employing the components of FIG. 8.

As indicated in FIG. 9, at stage 901 the first beam determiner 811 performs averaging of received powers of the radio signal over a set of predetermined transmit configurations for any receive configuration included in a plurality of receive configurations of the antenna array of the wireless communication device. In other words, in various aspects, the radio signal y (a signal vector including $N_r$ individual signals for each antenna in the antenna array of the wireless communication device) may be received from a transmitter such as a base station. A plurality of transmit configurations of the transmitter may be predefined and known to the wireless communication device, i.e. stored e.g. in the form of a codebook at the wireless communication device. The predetermined transmission configurations may in various aspects e.g. correspond to respective amplitudes and/or phase shifts to be applied to antennas included in one or more respective antenna arrays of the transmitter, e.g. the base station.

The first beam determiner 811 may further select a set of receive configurations from the plurality of receive configurations for which the respective received power is largest, and then determine the first compression operator based on the selected set of receive configurations. Thus, at stage 902, the first beam determiner 811 may first determine an average received power $u_i$ for the receive configurations $f_{rx,i}$ and select a set of $K_1$ receive beams $u_i$ with largest received power at stage 903. More specifically, the first beam determiner 811 may select $K_1 \geq K$ strongest (for example DFT beamforming codebook) beams in terms of received power (denoted by $u_i$) averaged over all Tx beams:

$$u_i = \frac{1}{N_t T} \sum_{t=1}^{T} \sum_{j=1}^{N_t} |f_{rx,i}^H y(t) f_{tx,j}|^2$$

where $f_{tx,j}$ is the jth column of a sector-sweeping matrix $F_{tx}$ ("tx" indicating the "transmit" direction) and $N_t$ being the number of predefined transmit configurations (also referred to as transmit beams). Thus, performing the averaging upon determining $u_i$, the received power is averaged across all Tx beams while the above computation of $v_i$ captures in particular multiple dominant multipath components. Having determined $u_i$, the first compression operator can be represented by a matrix including $K_1$ columns corresponding to the selected $u_i$:

$W_1 = F_{rx}[:,I]$, where $I = \{i: K_1 \text{ largest } u_i\text{'s}\}$.

In this notation, ":" in [:,I] is to denote "all rows" (as appreciated by the skilled person, again using Matlab notation as used throughout the present disclosure). In other words, the first beam determiner 811 is configured to determine the first compression operator at stage 904 based on the selected set of receive configurations.

Further, in various aspects, at stage 905 the first compression operator 811 may be further configured to select a transmit configuration for the determined first compression operator for which the received power for the radio signal is maximum. For example, for $W_1$ determined as above and fixed, a best Tx beam b can be selected by selecting components that maximize the received power such that $$b = \underset{f_{tx,j}}{\operatorname{argmax}} \frac{1}{T} \sum_{t=1}^{T} |W_1^H y(t) f_{tx,j}|^2$$

The described phase of determining b may be referred to as transmission sector sweeping phase. In a following phase (which may be referred to as data communication phase), in various aspects, the channel estimator may be configured to determine the channel covariance of the radio signal based on the selected transmit configuration. In other words, for a b determined in the transmission sector sweeping phase, $W_2$ may be computed using the two-stage compression at stage 906. Thereby, the covariance $\tilde{R}$ may be determined by computing the expected value of the matrix $\tilde{y}_{pilot}(f)\tilde{y}_{pilot}(f)^H$ as described above. Here, the received reference or pilot signal may in various aspects be determined and/or received using the determined best receive beam b. Having thus determined the first and second compression operators $W_1$ and $W_2$, the first and second compressed signals may be computed applying $W=W_1 W_2$ to the received signal.

In a following beam management phase, the second beam determiner 813 may then select a transmit configuration that maximizes alignment between transmit configuration and the received signal. In other words, at stage 907, given the two-stage compression matrix $W=W_1 W_2$, the second beam determiner may be configured to search a best Tx beam b' improving the beam alignment:

$$b' = \underset{f_{tx,j}}{\operatorname{argmax}} \frac{1}{T} \sum_{t=1}^{T} |W^H y(t) f_{tx,j}|^2$$

At stage 908, it may be determined if beam alignment is finished if b' is satisfactory. For example, a difference between b and b' may be compared to a predetermined threshold and if the difference is found to be small, the process may finish and the found best transmit configuration may be transmitted to the transmitter at stage 908. In this way, the two-stage compression method may be used for example for supporting and improving tracking of a moving wireless device such as a mobile terminal. If at stage 908 the result is found to be not satisfactory (e.g. if the difference between b and b' is too large, b' may be fed back to stage 906 for further refining and adoption of $W_2$.

It is noted that the use of a DFT codebook may be advantageous for both the transmit and the receive beams. However, the method is not restricted to a DFT codebook but any codebook may be employed.

The terms "user equipment", "UE", "mobile terminal", "user terminal", etc., may apply to any wireless communication device, including cellular phones, tablets, laptops, personal computers, wearables, multimedia playback and other handheld electronic devices, consumer/home/office/ commercial appliances, vehicles, and any number of additional electronic devices capable of wireless communications.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is a wireless communication device comprising: at least one antenna array configured to receive a radio signal; a first compressor configured to determine a first compression operator based on a predetermined set of receive configurations for the antenna array, and to apply the first compression operator to the radio signal to generate a first compressed signal; a second compressor configured to apply a second compression operator to the first compressed signal to generate a second compressed signal; a channel estimator configured to determine a channel covariance of the radio signal, determine at least one eigenvector of the channel covariance to obtain a second compression operator, and provide the second compression operator to the second compressor; and a baseband processor configured to receive the second compressed signal from the second compressor and to process the second compressed signal to obtain output data.

In Example 2, the subject matter of Example 1 can optionally include wherein the first compressor is configured to select the predetermined set of receive configurations based on received powers for each receive configuration of the predetermined set of receive configurations.

In Example 3, the subject matter of any one of Examples 1 or 2 can optionally include wherein the channel estimator is configured to perform an eigenvalue decomposition of the channel covariance to determine the at least one eigenvector.

In Example 4, the subject matter of any one of Examples 1 to 3 can optionally include wherein the channel estimator is configured to determine a set of eigenvectors of the channel covariance to obtain the second compression operator, where each one of the set of eigenvectors corresponds to an angular direction of a receive configuration of the antenna array.

In Example 5, the subject matter of any one of Examples 1 to 4 can optionally include wherein the channel estimator is configured to determine a set of eigenvectors of the channel covariance to obtain the second compression operator, where the set of eigenvectors corresponds to a set of respective eigenvalues which are largest among all eigenvalues of the channel covariance.

In Example 6, the subject matter of any one of Examples 1 to 5 can optionally include wherein the channel estimator is configured to determine a set of eigenvectors of the channel covariance, and wherein each eigenvector of the determined set forms a column of a matrix representing the second compression operator.

In Example 7, the subject matter of any one of Examples 1 to 6 can optionally include wherein the channel estimator is configured to determine the channel covariance of the radio signal based on a set of received reference signals.

In Example 8, the subject matter of any one of Examples 1 to 6 can optionally include wherein the channel estimator is configured to determine the channel covariance of the radio signal based on a set of received reference signals to which the first compression operator has been applied.

In Example 9, the subject matter of any one of Examples 1 to 8 can optionally include wherein the channel estimator is configured to determine the channel covariance based on at least one received reference or pilot signal and to determine a set of K eigenvectors of the determined channel covariance, K being a positive integer, where the set is chosen such that the eigenvectors correspond to the K largest eigenvalues of the channel covariance.

In Example 10, the subject matter of any one of Examples 1 to 9 can optionally include wherein each receive configuration corresponds to a beamforming codeword for specifying phase shifts and/or amplitudes for each antenna element included in the antenna array.

In Example 11, the subject matter of any one of Examples 1 to 10 can optionally include wherein the first compressor is configured to perform a fast Fourier transformation to determine an average received power for the radio signal for each of a plurality of receive configurations, and is configured to select $K_1$ receive configurations, $K_1$ being a positive integer, to form the predetermined set of receive configurations which correspond to the $K_1$ largest average received powers.

In Example 12, the subject matter of any one of Examples 1 to 10 wherein the first compressor comprises an analog RF beamformer configured to determine the predetermined set of receive configurations to correspond to $K_1$ receive configurations for which an average received power of the radio signal is largest within a plurality of receive configurations, $K_1$ being a positive integer.

In Example 13, the subject matter of any one of Examples 9 to 12 can optionally include wherein $K_1$ is a positive integer larger than K and smaller than a number $N_r$ of antenna elements included in the antenna array.

In Example 14, the subject matter of any one of Examples 1 to 13 can optionally include further comprising a first beam determiner configured to average received power of the radio signal over a set of predetermined transmit configurations for any receive configuration included in a plurality of receive configurations of the antenna array, to select the predetermined set of receive configurations from the plurality of receive configurations, and to determine the first compression operator based on the set of selected receive configurations.

In Example 15, the subject matter of Example 14 can optionally include wherein the at least one antenna array is configured to receive the radio signal from a transmitter, and wherein a transmit configuration corresponds to a beamforming codeword for specifying phase shifts and/or amplitudes for each antenna element included in an antenna array of the transmitter.

In Example 16, the subject matter of any one of Examples 14 or 15 can optionally include wherein the first beam determiner is further configured to select a transmit configuration among a plurality of predefined transmit configurations for the determined first compression operator for which the received power for the radio signal is maximum.

In Example 17, the subject matter of Example 16 can optionally include wherein the channel estimator is configured to determine the channel covariance of the radio signal based on the selected transmit configuration.

In Example 18, the subject matter of Example 17 can optionally include further comprising a second beam determiner configured to select a transmit configuration that maximizes alignment between transmit configuration and the received signal.

In Example 19, the subject matter of any one of Examples 1 to 18 can optionally include wherein the wireless communication device is a mobile terminal configured to communicate with at least one corresponding base station of a mobile communication network, and wherein the radio signal is received from the base station.

Example 20 is a wireless communication method comprising: receiving a radio signal via at least one antenna array; determining a first compression operator based on a predetermined set of receive configurations for the antenna array; determining a channel covariance of the radio signal; determining at least one eigenvector of the channel covariance to obtain a second compression operator; applying the first compression operator to the radio signal to generate a first compressed signal; applying the second compression operator to the first compressed signal to generate a second compressed signal; and processing the second compressed signal to obtain output data.

In Example 21, the subject matter of Example 20 can optionally include further comprising selecting the predetermined set of receive configurations based on received powers for each receive configuration of the predetermined set of receive configurations.

In Example 22, the subject matter of any one of Examples 20 or 21 can optionally include further comprising performing an eigenvalue decomposition of the channel covariance to determine the at least one eigenvector.

In Example 23, the subject matter of any one of Examples 20 to 22 can optionally include further comprising determining a set of eigenvectors of the channel covariance to obtain the second compression operator, where each one of the set of eigenvectors corresponds to an angular direction of a receive configuration of the antenna array.

In Example 24, the subject matter of any one of Examples 20 to 23 can optionally include further comprising determining a set of eigenvectors of the channel covariance to obtain the second compression operator, where the set of eigenvectors corresponds to a set of respective eigenvalues which are largest among all eigenvalues of the channel covariance.

In Example 25, the subject matter of any one of Examples 20 to 24 can optionally include further comprising determining a set of eigenvectors of the channel covariance, and wherein each eigenvector of the determined set forms a column of a matrix representing the second compression operator.

In Example 26, the subject matter of any one of Examples 20 to 25 can optionally include further comprising determining the channel covariance of the radio signal based on a set of received reference signals.

In Example 27, the subject matter of any one of Examples 20 to 25 can optionally include further comprising determining the channel covariance of the radio signal based on a set of received reference signals to which the first compression operator has been applied.

In Example 28, the subject matter of any one of Examples 20 to 27 can optionally include further comprising determining the channel covariance based on at least one received reference or pilot signal and determining a set of K eigenvectors of the determined channel covariance, K being a positive integer, where the determining comprises choosing the set such that the eigenvectors correspond to the K largest eigenvalues of the channel covariance.

In Example 29, the subject matter of any one of Examples 20 to 28 can optionally include wherein each receive configuration corresponds to a beamforming codeword for specifying phase shifts and/or amplitudes for each antenna element included in the antenna array.

In Example 30, the subject matter of any one of Examples 20 to 29 can optionally include further comprising performing a fast Fourier transformation to determine an average received power for the radio signal for each of a plurality of receive configurations, and selecting $K_1$ receive configurations, $K_1$ being a positive integer, to form the predetermined set of receive configurations which correspond to the $K_1$ largest average received powers.

In Example 31, the subject matter of any one of Examples 20 to 29 can optionally include further comprising determining the predetermined set of receive configurations to correspond to $K_1$ receive configurations for which an average received power of the radio signal is largest within a plurality of receive configurations, $K_1$ being a positive integer.

In Example 32, the subject matter of any one of Examples 28 to 31 can optionally include wherein $K_1$ is a positive integer larger than K and smaller than a number $N_r$ of antenna elements included in the antenna array.

In Example 33, the subject matter of any one of Examples 20 to 32 can optionally include further comprising averaging received power of the radio signal over a set of predetermined transmit configurations for any receive configuration included in a plurality of receive configurations of the antenna array, selecting the predetermined set of receive configurations from the plurality of receive configurations, and determining the first compression operator based on the set of selected receive configurations.

In Example 34, the subject matter of Example 33 can optionally include receiving the radio signal from a transmitter, and wherein a transmit configuration corresponds to a beamforming codeword for specifying phase shifts and/or amplitudes for each antenna element included in an antenna array of the transmitter.

In Example 35, the subject matter of any one of Examples 33 or 34 can optionally include further comprising selecting a transmit configuration among a plurality of predefined transmit configurations for the determined first compression operator for which the received power for the radio signal is maximum.

In Example 36, the subject matter of Example 35 can optionally include further comprising determining the channel covariance of the radio signal based on the selected transmit configuration.

In Example 37, the subject matter of Example 36 can optionally include further comprising selecting a transmit configuration that maximizes alignment between transmit configuration and the received signal.

Example 38 is a wireless communication device comprising: at least one antenna array configured to receive a radio signal; one or more processors configured to determine a channel covariance of the radio signal, determine at least one eigenvector of the channel covariance to obtain a second compression operator; determine a first compression operator based on a predetermined set of receive configurations for the antenna array, and to apply the first compression operator to the radio signal to generate a first compressed signal; apply the second compression operator to the first compressed signal to generate a second compressed signal; and a baseband processor configured to receive the second compressed signal from the second compressor and to process the second compressed signal to obtain output data.

In Example 39, the subject matter of Example 38 can optionally include wherein the one or more processors are configured to select the predetermined set of receive configurations based on received powers for each receive configuration of the predetermined set of receive configurations.

In Example 40, the subject matter of any one of Examples 38 or 39 can optionally include wherein the one or more processors are configured to perform an eigenvalue decomposition of the channel covariance to determine the at least one eigenvector.

In Example 41, the subject matter of any one of Examples 38 to 40 can optionally include wherein the one or more processors are configured to determine a set of eigenvectors of the channel covariance to obtain the second compression operator, where each one of the set of eigenvectors corresponds to an angular direction of a receive configuration of the antenna array.

In Example 42, the subject matter of any one of Examples 38 to 41 can optionally include wherein the one or more processors are configured to determine a set of eigenvectors of the channel covariance to obtain the second compression operator, where the set of eigenvectors corresponds to a set of respective eigenvalues which are largest among all eigenvalues of the channel covariance.

In Example 43, the subject matter of any one of Examples 38 to 42 can optionally include wherein the one or more processors are configured to determine a set of eigenvectors of the channel covariance, and wherein each eigenvector of the determined set forms a column of a matrix representing the second compression operator.

In Example 44, the subject matter of any one of Examples 38 to 43 can optionally include wherein the one or more processors are configured to determine the channel covariance of the radio signal based on a set of received reference signals.

In Example 45, the subject matter of any one of Examples 38 to 43 can optionally include wherein the one or more processors are configured to determine the channel covariance of the radio signal based on a set of received reference signals to which the first compression operator has been applied.

In Example 46, the subject matter of any one of Examples 38 to 45 can optionally include wherein the one or more processors are configured to determine the channel covariance based on at least one received reference or pilot signal and to determine a set of K eigenvectors of the determined channel covariance, K being a positive integer, where the set is chosen such that the eigenvectors correspond to the K largest eigenvalues of the channel covariance.

In Example 47, the subject matter of any one of Examples 38 to 46 can optionally include wherein each receive configuration corresponds to a beamforming codeword for specifying phase shifts and/or amplitudes for each antenna element included in the antenna array.

In Example 48, the subject matter of any one of Examples 38 to 47 can optionally include wherein the one or more processors are configured to perform a fast Fourier transformation to determine an average received power for the radio signal for each of a plurality of receive configurations, and is configured to select $K_1$ receive configurations, $K_1$ being a positive integer, to form the predetermined set of receive configurations which correspond to the $K_1$ largest average received powers.

In Example 49, the subject matter of any one of Examples 38 to 47 can optionally include wherein the one or more processors are configured to determine the predetermined set of receive configurations to correspond to $K_1$ receive configurations for which an average received power of the radio signal is largest within a plurality of receive configurations, $K_1$ being a positive integer.

In Example 50, the subject matter of any one of Examples 46 to 49 can optionally include wherein $K_1$ is a positive integer larger than K and smaller than a number $N_r$ of antenna elements included in the antenna array.

In Example 51, the subject matter of any one of Examples 38 to 50 can optionally include wherein the one or more processors are further configured to average received power of the radio signal over a set of predetermined transmit configurations for any receive configuration included in a plurality of receive configurations of the antenna array, to select the predetermined set of receive configurations from the plurality of receive configurations, and to determine the first compression operator based on the set of selected receive configurations.

In Example 52, the subject matter of Example 51 can optionally include wherein the at least one antenna array is configured to receive the radio signal from a transmitter, and wherein a transmit configuration corresponds to a beamforming codeword for specifying phase shifts and/or amplitudes for each antenna element included in an antenna array of the transmitter.

In Example 53, the subject matter of any one of Examples 51 to 52 can optionally include wherein the one or more processors are further configured to select a transmit configuration among a plurality of predefined transmit configurations for the determined first compression operator for which the received power for the radio signal is maximum.

In Example 54, the subject matter of Example 53 can optionally include wherein the one or more processors are configured to determine the channel covariance of the radio signal based on the selected transmit configuration.

In Example 55, the subject matter of Example 54 can optionally include wherein the one or more processors are further configured to select a transmit configuration that maximizes alignment between transmit configuration and the received signal.

In Example 56, the subject matter of any one of Examples 38 to 55 can optionally include wherein the wireless communication device is a mobile terminal configured to communicate with at least one corresponding base station of a mobile communication network, and wherein the radio signal is received from the base station.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless communication device comprising:
   at least one antenna array configured to receive a radio signal;
   a first compressor configured to determine a first compression operator based on a predetermined set of receive configurations for the antenna array, and to apply the first compression operator to the radio signal to generate a first compressed signal;
   a second compressor configured to apply a second compression operator to the first compressed signal to generate a second compressed signal;
   a channel estimator configured to determine a channel covariance of the radio signal, determine at least one eigenvector of the channel covariance to obtain a second compression operator, and provide the second compression operator to the second compressor; and
   a baseband processor configured to receive the second compressed signal from the second compressor and to process the second compressed signal to obtain output data.

2. The wireless communication device according to claim 1, wherein the first compressor is configured to select the predetermined set of receive configurations based on received powers for each receive configuration of the predetermined set of receive configurations.

3. The wireless communication device according to claim 1, wherein the channel estimator is configured to perform an eigenvalue decomposition of the channel covariance to determine the at least one eigenvector.

4. The wireless communication device according to claim 1, wherein the channel estimator is configured to determine a set of eigenvectors of the channel covariance to obtain the second compression operator, where each one of the set of eigenvectors corresponds to an angular direction of a receive configuration of the antenna array.

5. The wireless communication device according to claim 1, wherein the channel estimator is configured to determine a set of eigenvectors of the channel covariance to obtain the second compression operator, where the set of eigenvectors corresponds to a set of respective eigenvalues which are largest among all eigenvalues of the channel covariance.

6. The wireless communication device according to claim 1, wherein the channel estimator is configured to determine the channel covariance of the radio signal based on a set of received reference signals to which the first compression operator has been applied.

7. The wireless communication device according to claim 1, wherein the channel estimator is configured to determine the channel covariance based on at least one received reference or pilot signal and to determine a set of K eigenvectors of the determined channel covariance, K being a positive integer, where the set is chosen such that the eigenvectors correspond to the K largest eigenvalues of the channel covariance.

8. The wireless communication device according to claim 1, wherein each receive configuration corresponds to a beamforming codeword for specifying phase shifts and/or amplitudes for each antenna element included in the antenna array.

9. The wireless communication device according to claim 1, wherein the first compressor is configured to perform a fast Fourier transformation to determine an average received power for the radio signal for each of a plurality of receive configurations, and is configured to select $K_1$ receive configurations, $K_1$ being a positive integer, to form the predetermined set of receive configurations which correspond to the $K_1$ largest average received powers.

10. The wireless communication device according to claim 1, wherein the first compressor comprises an analog RF beamformer configured to determine the predetermined set of receive configurations to correspond to $K_1$ receive configurations for which an average received power of the radio signal is largest within a plurality of receive configurations, $K_1$ being a positive integer.

11. The wireless communication device according to claim 1, further comprising a first beam determiner configured to average received power of the radio signal over a set of predetermined transmit configurations for any receive configuration included in a plurality of receive configurations of the antenna array, to select the predetermined set of receive configurations from the plurality of receive configurations, and to determine the first compression operator based on the set of selected receive configurations.

12. The wireless communication device according to claim 11, wherein the at least one antenna array is configured to receive the radio signal from a transmitter, and wherein a transmit configuration corresponds to a beamforming codeword for specifying phase shifts and/or amplitudes for each antenna element included in an antenna array of the transmitter.

13. The wireless communication device according to claim 11, wherein the first beam determiner is further configured to select a transmit configuration among a plurality of predefined transmit configurations for the determined first compression operator for which the received power for the radio signal is maximum.

14. The wireless communication device according to claim 1, wherein the wireless communication device is a mobile terminal configured to communicate with at least one corresponding base station of a mobile communication network, and wherein the radio signal is received from the base station.

15. A wireless communication method comprising:
receiving a radio signal via at least one antenna array;
determining a first compression operator based on a predetermined set of receive configurations for the antenna array;
determining a channel covariance of the radio signal;
determining at least one eigenvector of the channel covariance to obtain a second compression operator;
applying the first compression operator to the radio signal to generate a first compressed signal;
applying the second compression operator to the first compressed signal to generate a second compressed signal; and
processing the second compressed signal to obtain output data.

16. The wireless communication method according to claim 15, further comprising selecting the predetermined set of receive configurations based on received powers for each receive configuration of the predetermined set of receive configurations.

17. The wireless communication method according to claim 15, further comprising performing an eigenvalue decomposition of the channel covariance to determine the at least one eigenvector.

18. A wireless communication device comprising:
at least one antenna array configured to receive a radio signal;
one or more processors configured to
determine a channel covariance of the radio signal, determine at least one eigenvector of the channel covariance to obtain a second compression operator;
determine a first compression operator based on a predetermined set of receive configurations for the antenna array, and to apply the first compression operator to the radio signal to generate a first compressed signal;
apply the second compression operator to the first compressed signal to generate a second compressed signal; and
a baseband processor configured to receive the second compressed signal from the second compressor and to process the second compressed signal to obtain output data.

19. The wireless communication device according to claim 18, wherein the one or more processors are configured to select the predetermined set of receive configurations based on received powers for each receive configuration of the predetermined set of receive configurations.

20. The wireless communication device according to claim 18, wherein the one or more processors are configured to perform an eigenvalue decomposition of the channel covariance to determine the at least one eigenvector.

* * * * *